(12) United States Patent
Coffey (10) Patent No.: US 6,364,535 B1
(45) Date of Patent: Apr. 2, 2002

(54) UPGRADEABLE MEDIA WALL CONVERTER AND HOUSING

(75) Inventor: Joseph Coffey, Burnsville, MN (US)

(73) Assignee: ADC, Minnetonka, MN (US)

( * ) Notice: Subject to any disclaimer, the term of this patent is extended or adjusted under 35 U.S.C. 154(b) by 0 days.

(21) Appl. No.: 09/636,122

(22) Filed: Aug. 10, 2000

(51) Int. Cl.[7] .................................................. G02B 6/26
(52) U.S. Cl. ............................ 385/53; 385/92; 439/357
(58) Field of Search .............................. 385/53, 55, 88, 385/92, 134, 147; 439/352, 355, 357, 370

(56) References Cited

U.S. PATENT DOCUMENTS

| | | | | |
|---|---|---|---|---|
| 4,526,431 A | * | 7/1985 | Kasukawa | 439/153 |
| 5,104,243 A | * | 4/1992 | Harding | 385/84 |
| 5,767,999 A | * | 6/1998 | Kayner | 359/163 |
| 6,178,096 B1 | * | 1/2001 | Flickinger et al. | 361/816 |
| 6,220,873 B1 | * | 4/2001 | Samela et al. | 439/76.1 |

* cited by examiner

Primary Examiner—Tulsidas Patel
(74) Attorney, Agent, or Firm—Merchant & Gould P.C.

(57) ABSTRACT

An upgradeable media converter housing having a front housing and a rear housing. The front housing has a port for receiving a first connector, and a plurality of notches located on a periphery of the front housing. The rear housing has an open first end and a closed second end located distally from the first end. The rear housing also has a shoulder region located adjacent to the first end and a tubular region coupling the shoulder region to the closed end. A plurality of ramped protrusions located on an exterior surface of the shoulder engage a plurality of ramped protrusions located on the exterior surface of the shoulder of the rear housing to provide a snap-fit connection. The media converter fits into an existing faceplate of a wall outlet and can be upgraded by replacing a daughter board with another daughter board having a different converter mounted thereon.

30 Claims, 13 Drawing Sheets

UPGRADEABLE MEDIA WALL CONVERTER AND HOUSING

FIELD OF THE INVENTION

The present invention relates generally to telecommunications equipment and, more particularly, to a converter and its housing for providing connections between telecommunication transmission lines.

BACKGROUND OF THE INVENTION

Various electrical/fiberoptic connectors are known for use in the telecommunications industry to transmit voice, data and video signals. A common connector configuration includes a faceplate or outlet that is mounted on a structure such as a wall. The faceplate defines a plurality of openings in which connectors can be mounted. A typical connector includes a modular jack defining a port sized for receiving a conventional modular plug. Other conventional types of connectors include SC connectors, ST connectors, BNC connectors, F connectors and RCA connectors, for example.

With respect to electrical/fiberoptic connectors for the telecommunications industry, it is important that such connectors be easily installed, easily accessible after installation and easily repaired and/or upgraded. In this regard, it is desirable for the connector to be front mounted within their corresponding faceplates. By front mounting the connectors, the connectors can be accessed without requiring their corresponding faceplates to be removed from the wall.

In addition, as technologies advance, it is desirable to provide an adapter that is easily upgradable in a cost efficient manner. For example, it is desirable to provide an adapter that can be upgraded to operate at faster transmit rates or different protocols without replacing the entire adapter.

SUMMARY OF THE INVENTION

According to a first aspect of the invention, there is provided a media converter housing having a front housing and a rear housing. The front housing has a port for receiving a first connector, and a plurality of notches located on a periphery of the front housing. The rear housing has an open first end and a closed second end located distally from the first end, the rear housing having a shoulder region located adjacent to the first end and a tubular region coupling the shoulder region to the closed end, and a plurality of ramped protrusions located on an exterior surface of the shoulder, the plurality of ramped protrusions located on the exterior surface of the shoulder of the rear housing engage the plurality of notches on the front housing to provide a snap-fit connection.

According to a second aspect of the invention, there is provided an upgradeable converter including a housing assembly and a circuit assembly located within the housing assembly. The circuit assembly includes a first connector for transmitting and receiving signals in a first format, a second connector for transmitting and receiving signals in a second format wherein the second format is different than the first format, and a converter electrically coupled to the first and second connectors wherein the converter converts signals received in the first format to the second format and vice versa at a predetermined speed.

BRIEF DESCRIPTION OF THE DRAWINGS

The accompanying drawings, which are incorporated in and constitute a part of this specification, illustrate several aspects of the invention and together with the description, serve to explain the principles of the invention. A brief description of the drawings is as follows.

DETAILED DESCRIPTION OF THE PREFERRED EMBODIMENTS

Reference will now be made in detail to preferred aspects of the present invention that are illustrated in the accompanying drawings. Whenever possible, the same reference numbers will be used throughout the drawings to refer to the same or like parts.

Figure 1:
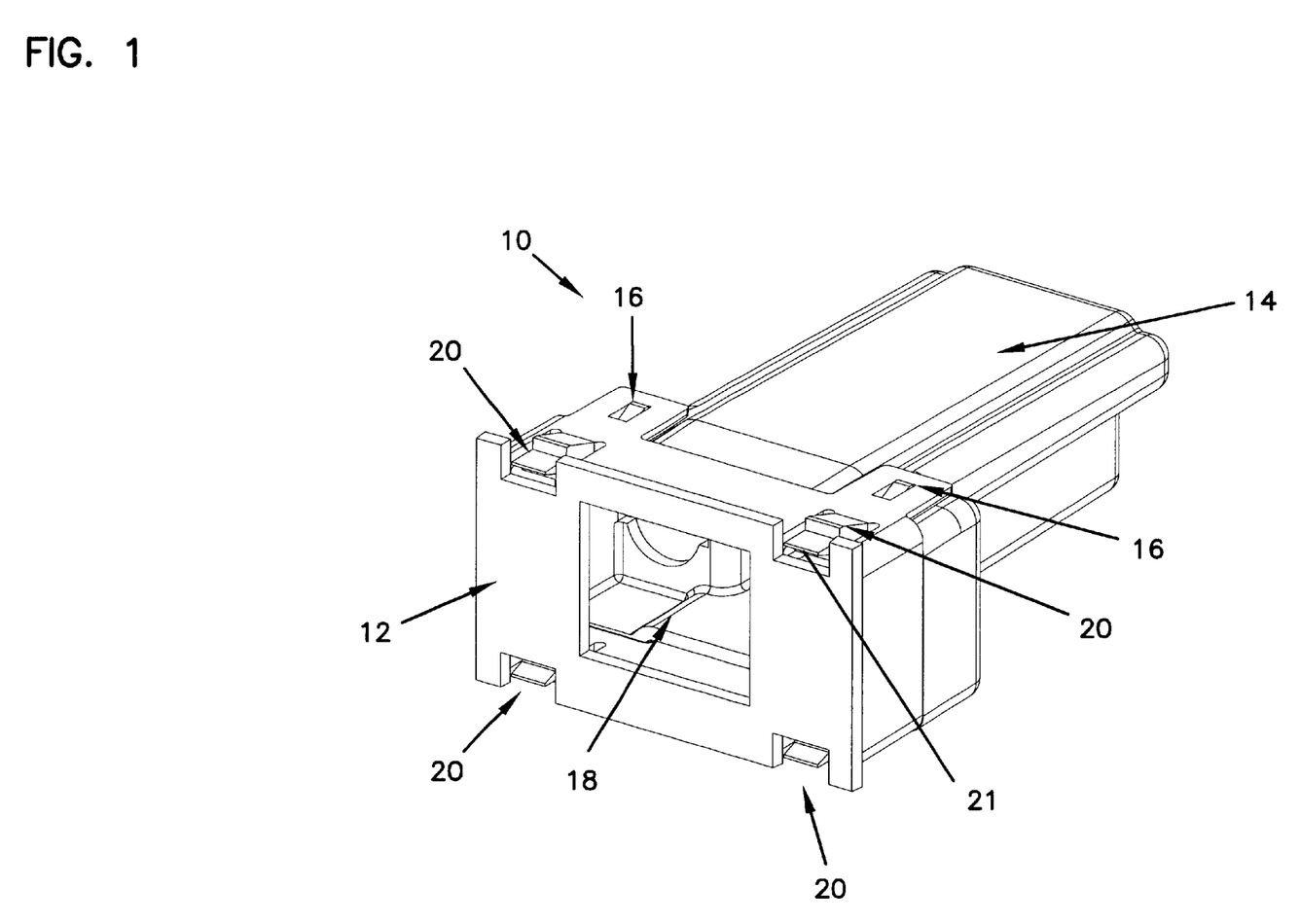
FIG. 1 is a perspective view of a media converter housing according to a preferred embodiment of the present invention.

FIG. 1 is a perspective view of a housing assembly for a media converter according to a preferred embodiment of the present invention. The media converter housing assembly 10 includes a front housing 12 and a rear housing 14. In a preferred embodiment the front housing 12 is separate from the rear housing 14 although, in another preferred embodiment they may be formed as an integral piece. The front housing 12 and the rear housing 14 are coupled together via snap-fit connections 16 which will be described in greater detail hereinafter. The front housing 12 has a port 18 formed therein to provide access to a connector such as a modular jack such as an RJ-45 jack (not shown). The front housing 12 also has four ramped tabs 20, two of which are located on a top surface of the front housing 12 and the other two of which are located on a bottom surface of the housing 12. The ramped tabs 20 allow the media converter housing assembly 10 to be retained within a faceplate of a wall outlet as will be described in detail with reference to FIGS. 12 and 13.

Figure 2:
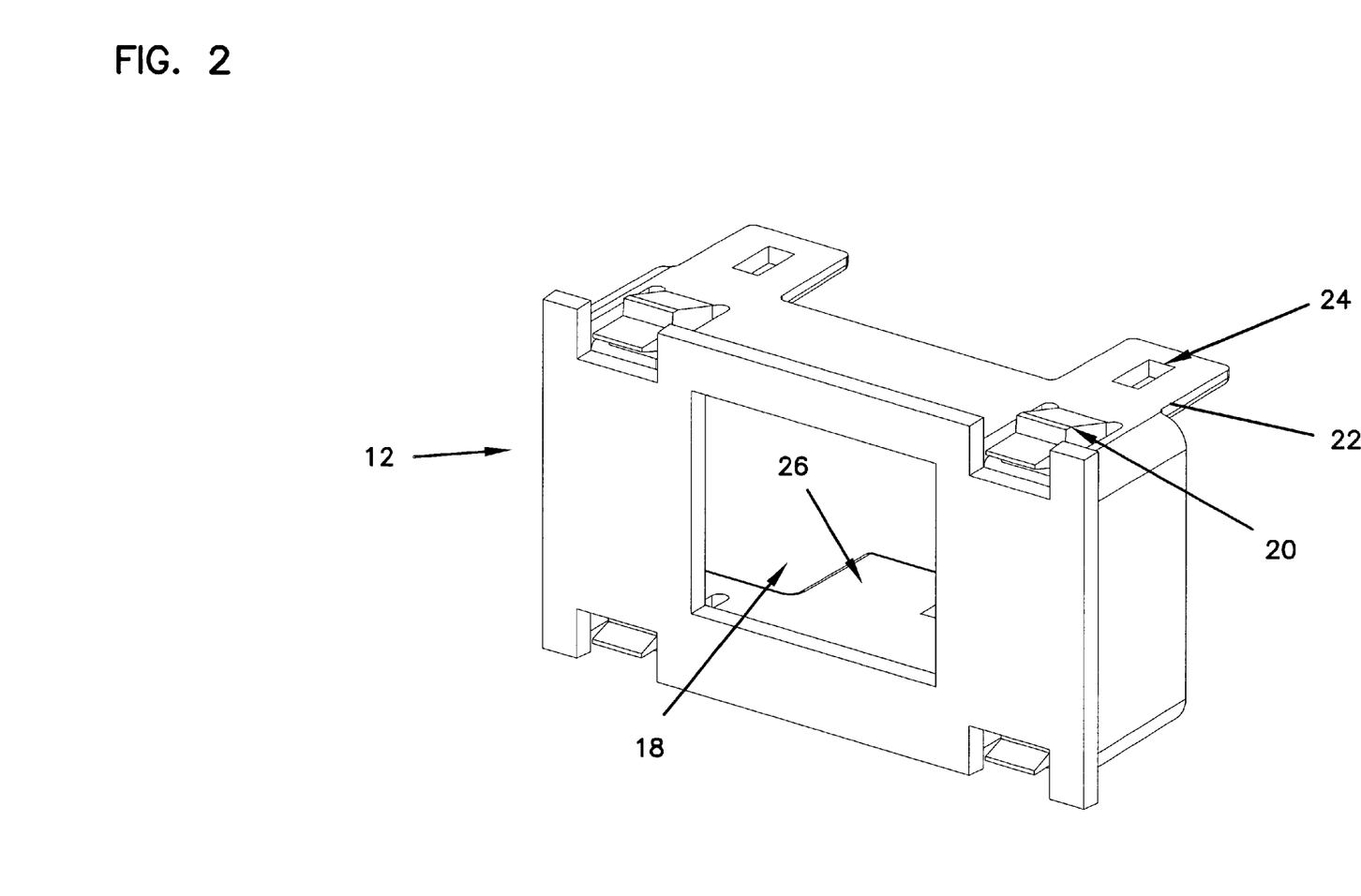
FIG. 2 is a perspective view of the front housing shown in FIG. 1.
Figure 4:
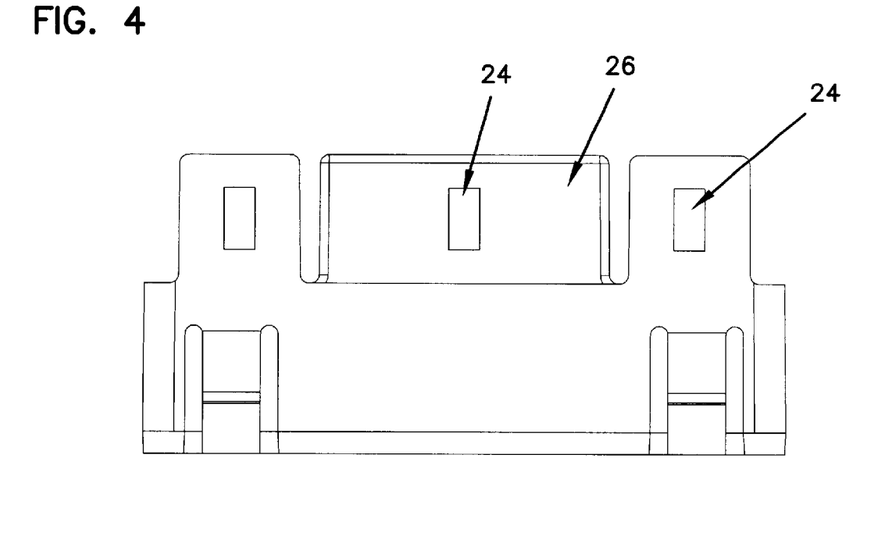
FIG. 4 is a top plan view of the front housing shown in FIG. 2.
Figure 5:
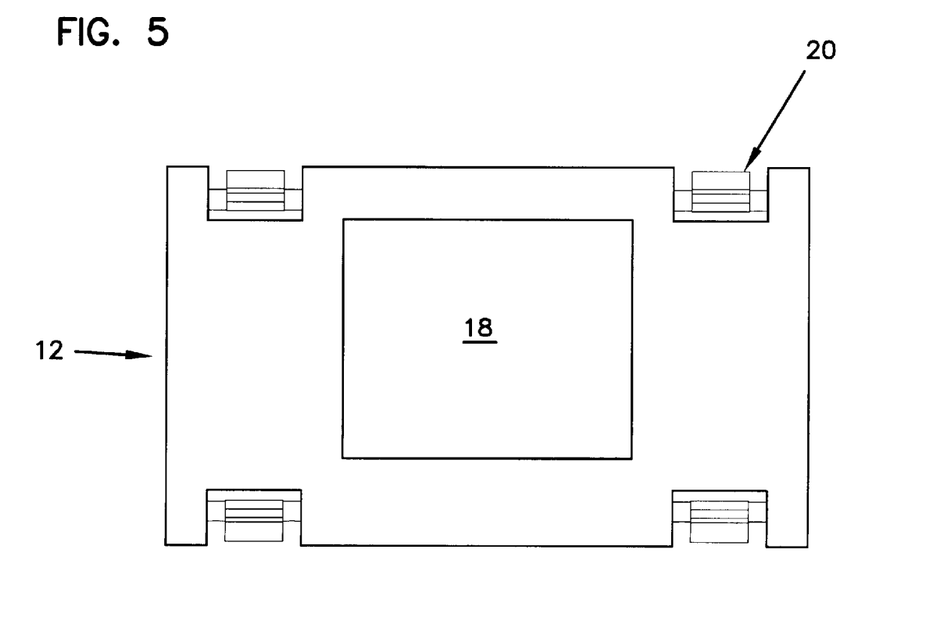
FIG. 5 is a front elevational view of the front housing shown in FIG. 2.
Figure 6:
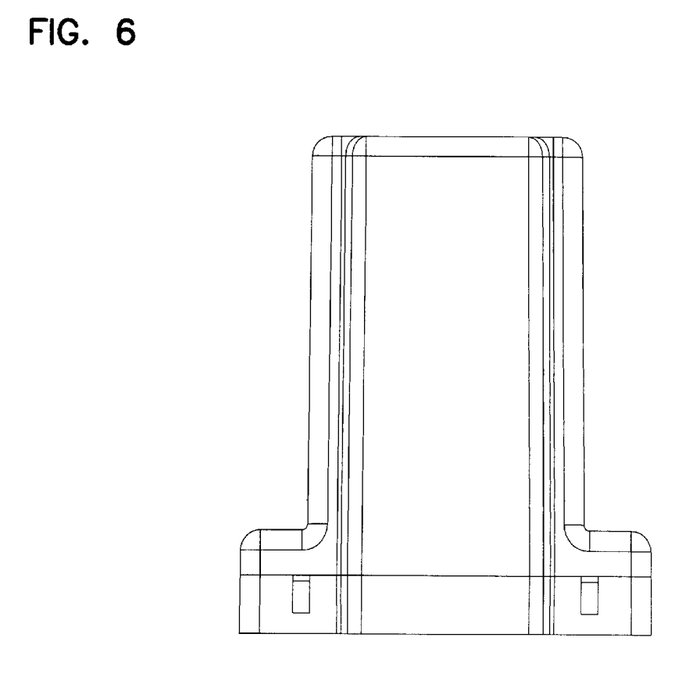
FIG. 6 is a top plan view of the rear housing shown in FIG. 3.

FIG. 2 is a perspective view of the front housing 12 shown in FIG. 1. The front housing has two top tabs 22 and a bottom tab 26 as seen in FIG. 4. Each of the top tabs 22 and bottom tabs 26 has a notch 24 formed therein. FIG. 4 is a top plan view of the front housing shown in FIG. 2. It can be seen that the bottom tab 26 extends between the top tabs 24. FIG. 5 is a front elevational view of the front housing 12 shown in FIG. 2.

Figure 3:
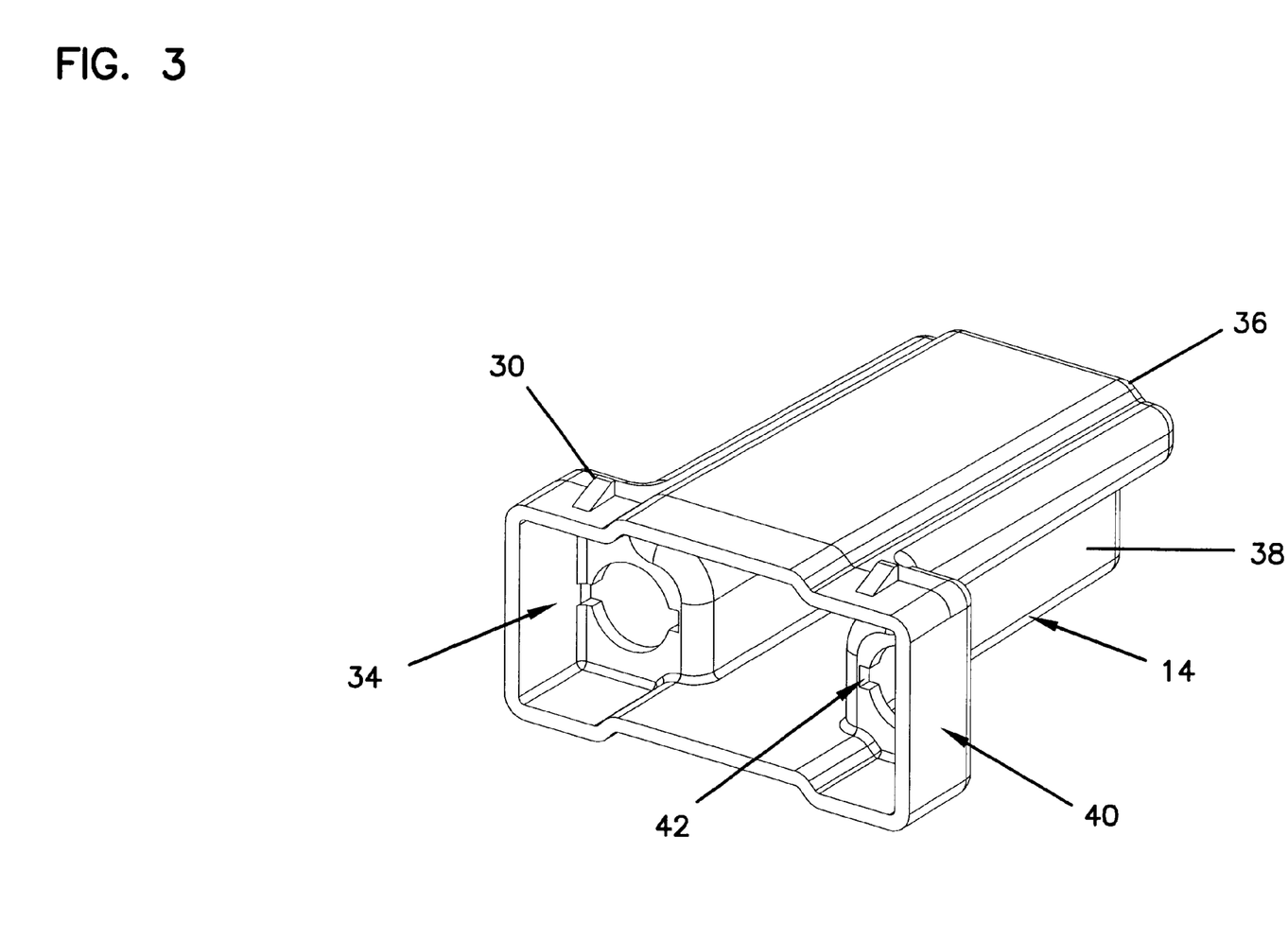
FIG. 3 is a perspective view of the rear housing shown in FIG. 1.
Figure 7:
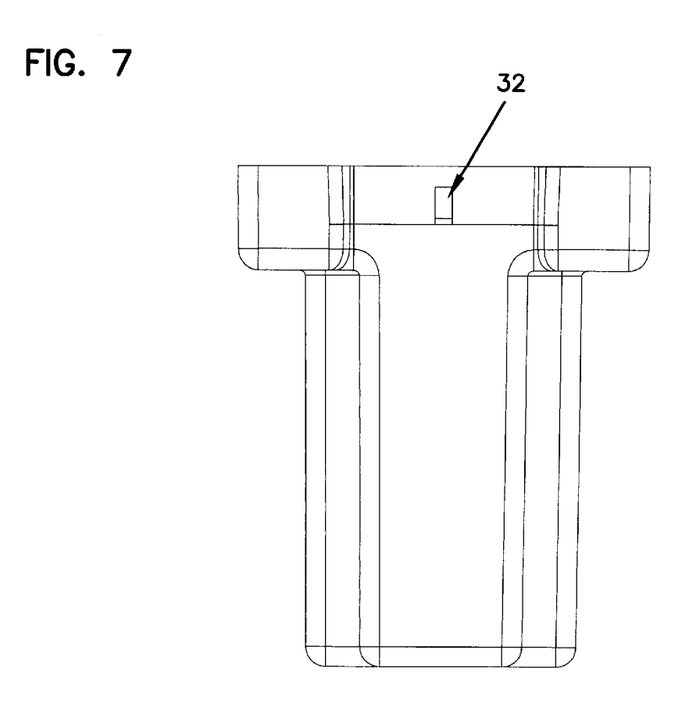
FIG. 7 is a bottom plan view of the rear housing shown in FIG. 3.

FIG. 3 is a perspective view of the rear housing 14 shown in FIG. 1. The rear housing 14 forms a receptacle to receive an adapter circuit assembly (not shown). In particular, the rear housing 14 has an open front 34 and a closed back wall 36. The proximal portion of the rear housing 14 has a shoulder region 40 and distal to that is a modified tubular member 38. Formed through a wall of the shoulder region 40 are apertures 42 which will be described in detail hereafter. The rear housing has two ramped protrusions 30 located on a top portion of the rear housing 14 in the shoulder region 40. Also, as can be seen in FIG. 7, a ramped protrusion 32 is formed substantially in the center of a bottom portion of the shoulder region 40. As will be described hereinafter, the ramped protrusions 30 of the rear housing 14 engage the notches 24 formed in the top tabs 22 of the front housing 12 and the ramped protrusion 32 of the rear housing 14 engages the notch 24 formed in the bottom tab 26 of the front housing 12 to provide the snap-fit connection.

Figure 8:
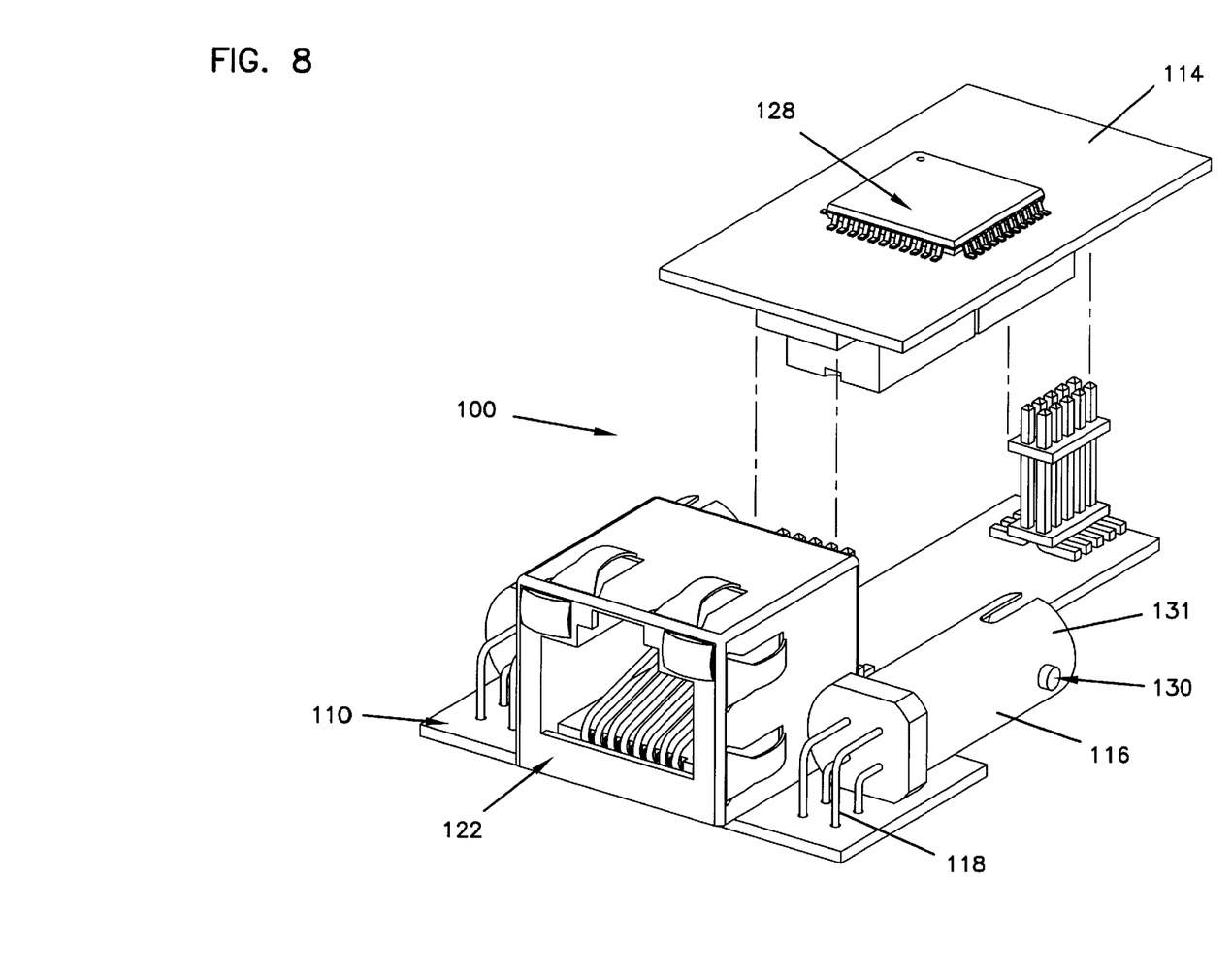
FIG. 8 is a perspective view from the front of a circuit assembly according to a preferred embodiment of the present invention.
Figure 9:
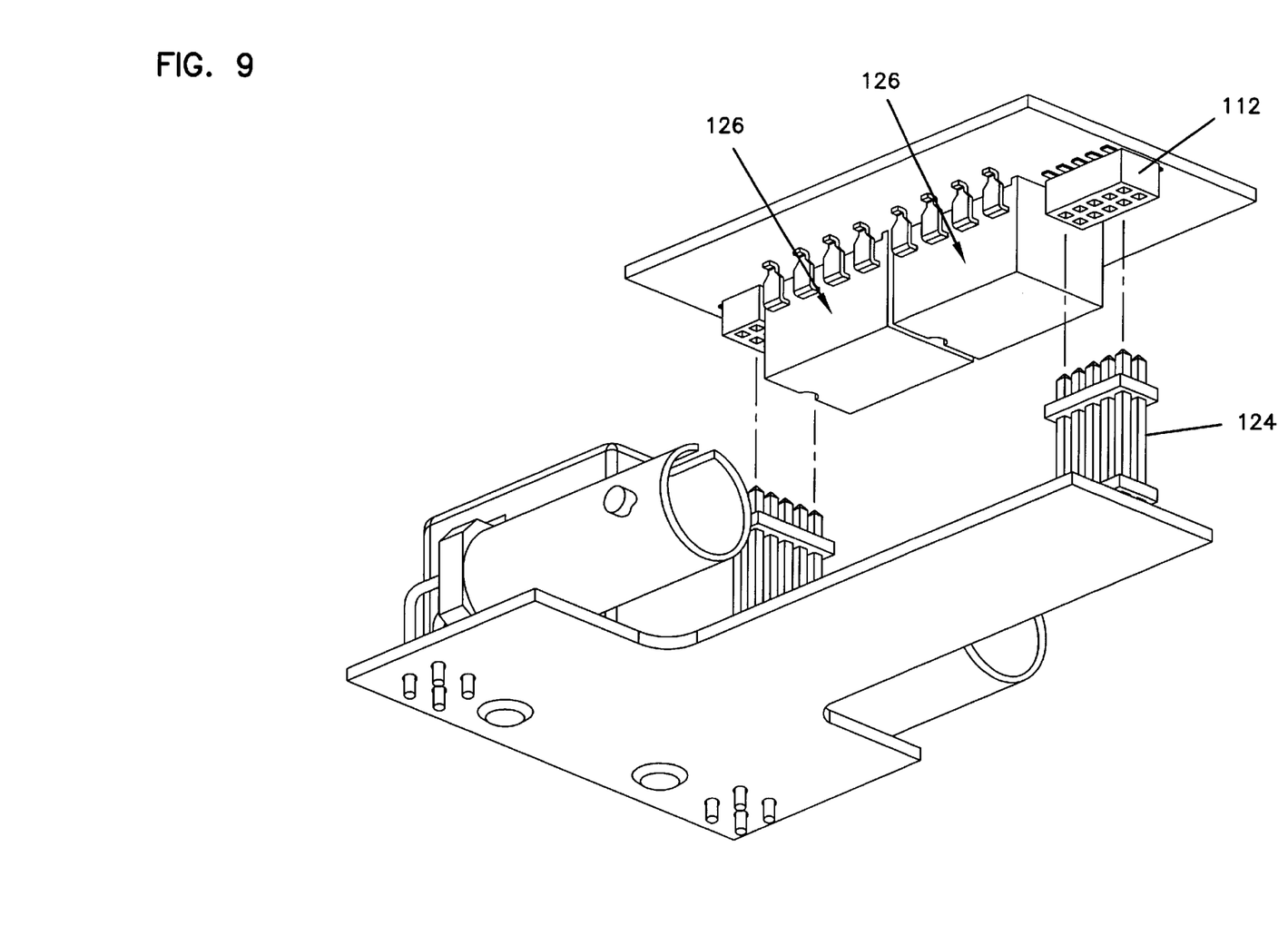
FIG. 9 is a perspective view from the bottom of the circuit assembly shown in FIG. 8.

FIG. 8 is a perspective view from the front of a circuit assembly 100 which can be located within housing 10 shown in FIG. 1. FIG. 9 is a perspective view from the bottom of the circuit assembly shown in FIG. 8. The circuit assembly includes a motherboard 110, and a daughter board 114. The motherboard 110 has electrically coupled thereto two optic fiber connectors 116 via coupling 118. The motherboard 110 also has preferably an RJ-45 jack 122 mounted thereon. The RJ-45 jack 122 is electrically coupled to the motherboard 110. The daughter board 114 has, preferably, on one side filters 126 and a converter chip 128 located on the other side. In a preferred embodiment, the connectors 116 are optical type connectors which have a bayonet 130 located on a ferrule 131 of the connector as is well known. The daughter board 114 is coupled to the motherboard 110 preferably by connectors 124, which are board interface connectors.

The circuit assembly 100 converts electrical signals received by the RJ-45 jack to optical signals and outputs the optical signal through connectors 116 to a fiber optic cable (not shown), and vice versa. In a preferred embodiment, the converter 128 is a 10BASE-T converter. Because of the novel construction of circuit assembly 100 and housing 10, daughter board 114 can be removed and replaced with another daughter board 114 having a different converter such as a 100BASE-TX converter thereby allowing the converter to be upgraded.

By making the circuit assembly upgradeable by simply replacing the daughter board, data rates can be increased and protocols may be changed at a reduced cost since the existing circuit assembly need not be replaced with a new one.

Figure 10:
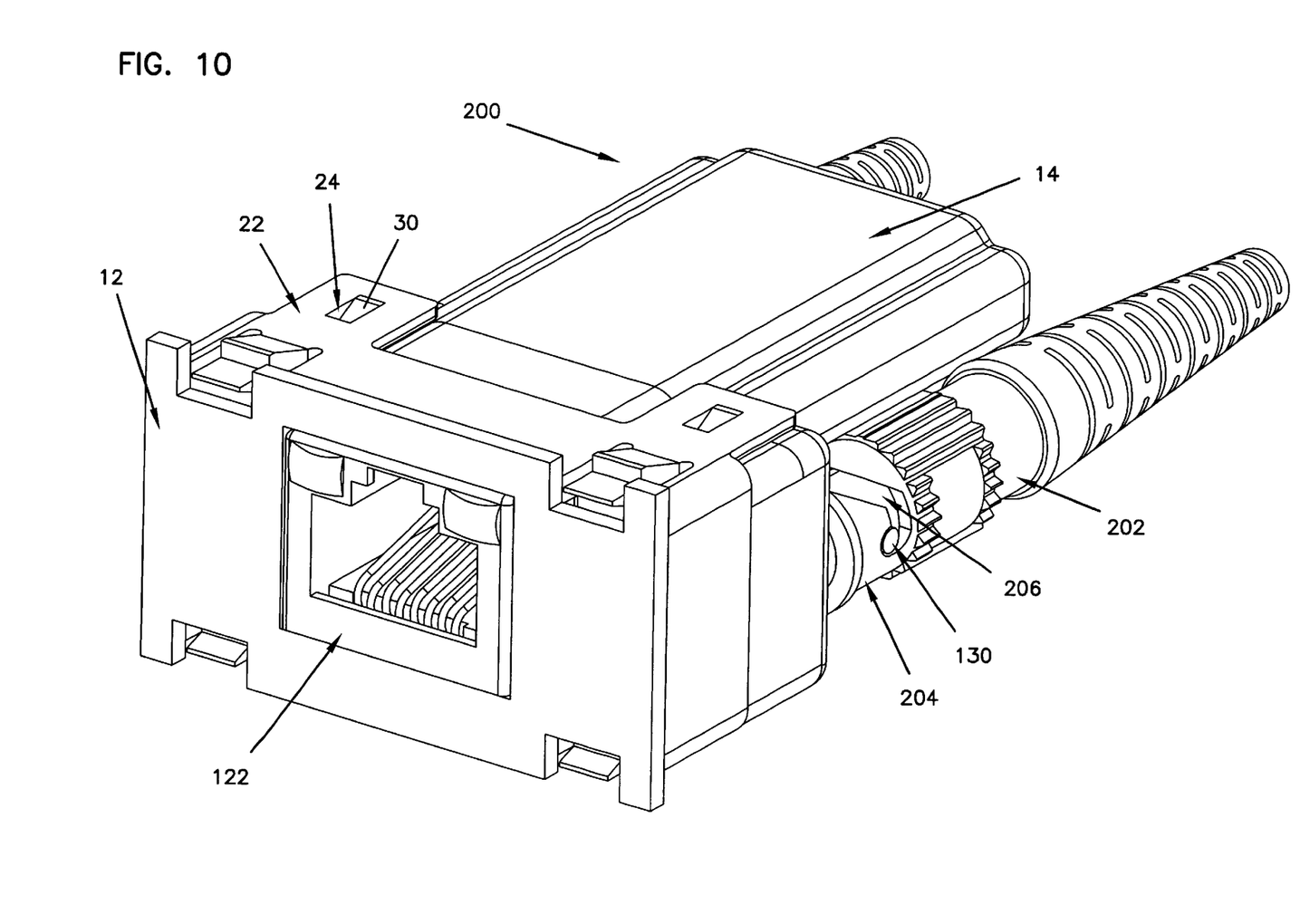
FIG. 10 is a perspective view of an assembled media converter according to a preferred embodiment of the present invention.
Figure 11:
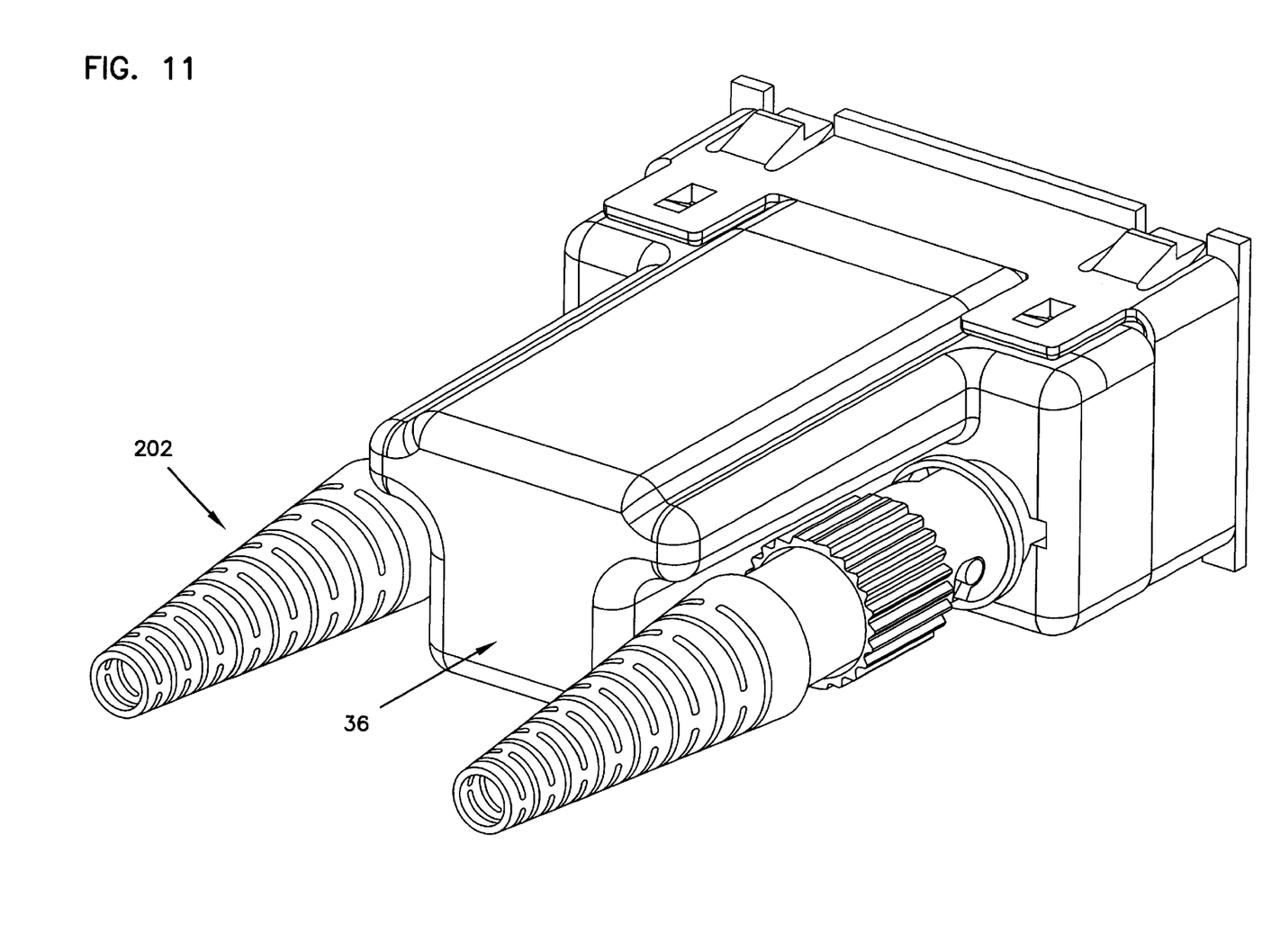
FIG. 11 is a perspective back view of the assembled media converter shown in FIG. 10.

FIG. 10 is a front perspective view of an assembled media converter 200 according to a preferred embodiment of the present invention. It can be seen that the rear housing 14 and the front housing 12 are coupled together by the ramped protrusions 30 engaging the notches 24 formed in the top tabs 22 of the front housing 12 and the ramped protrusion 32 formed in the rear housing 14 engaging notch 24 formed in the bottom tab 26 of the front housing 12 which cannot be seen. The RJ-45 jack 122 is accessible through the port 18 formed in the front housing 12. The optic fiber connectors 116 extend through the apertures 42 formed in the shoulder region 40 of the rear housing 14 so as to be exterior to the housing. As shown in this preferred embodiment, an ST fiber connector 202 is coupled to each of the optic fiber connectors 116 via a coupler 204. More particularly, the coupler 204 has a groove 206 which engages the bayonet 130 of each optic fiber connector 116 as is well known to those of ordinary skill in the art. FIG. 11 is a rear perspective view of the assembled media converter 200 shown in FIG. 10. From this view the closed back wall 36 of the rear housing 14 can be seen as well as the optic fiber connectors extending through the apertures 42 in the shoulder region 40 of the rear housing 14.

Figure 12:
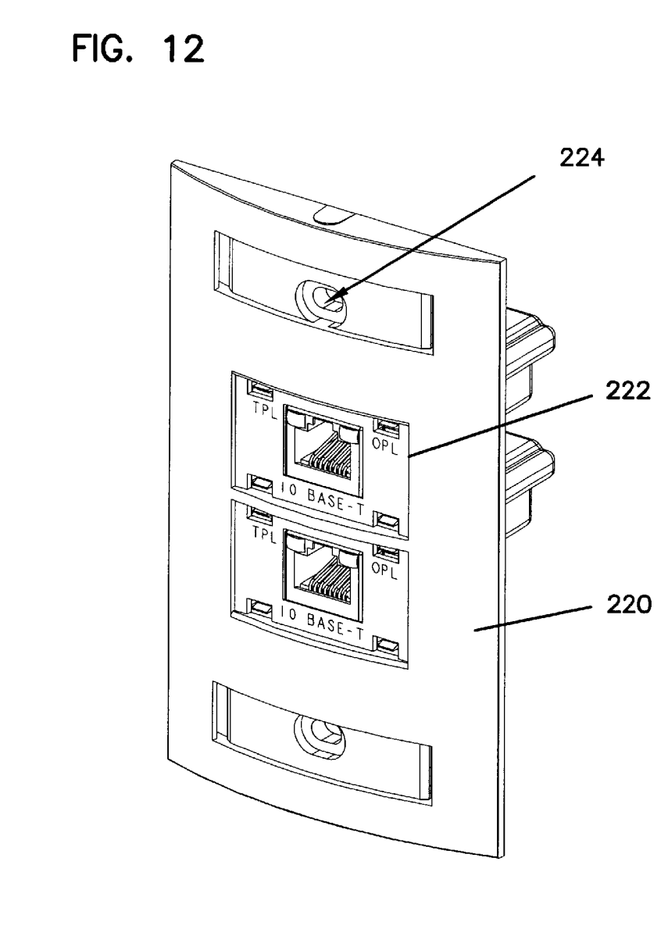
FIG. 12 is a front, perspective view of two converters according to the present invention mounted in a faceplate.
Figure 13:
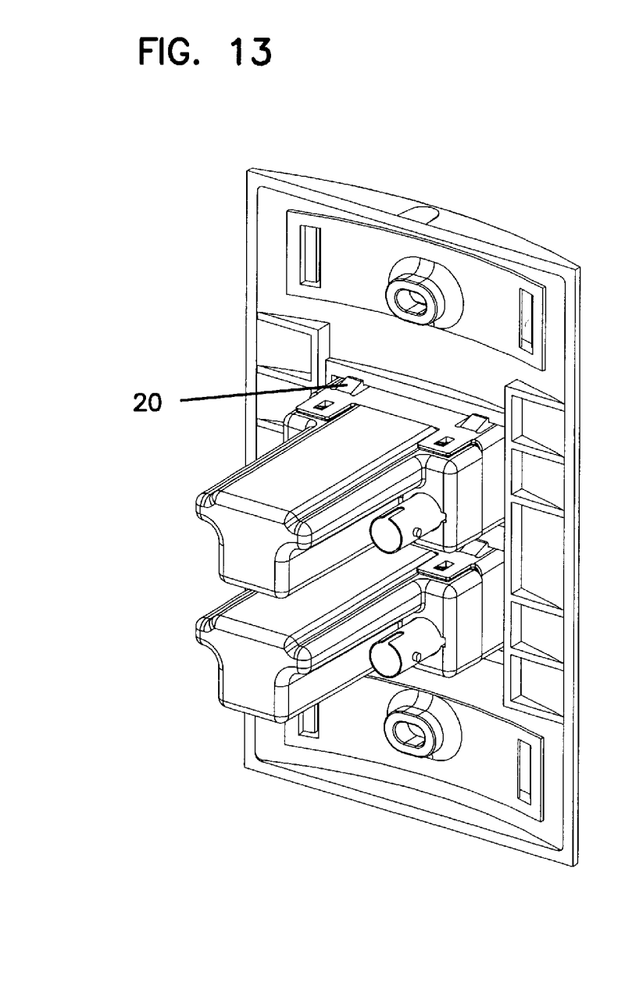
FIG. 13 is a rear, perspective view of two converters according to the present invention mounted in a faceplate.

FIGS. 12 and 13 show a front and rear perspective view of two converters 200 according to the present invention mounted in a faceplate. The faceplate 220 has two apertures 222 sized to receive the converters therein. The faceplate 220 includes holes 224 that allow the faceplate 220 to be bolted, screwed or otherwise connected to a wall.

When the converters 200 are inserted into openings 222, the ramped tabs 20 located on the front housing 10 are depressed and once they pass through the opening, they snap back to original shape and engage the faceplate 220 to hold the converter 200 therein as can be seen in FIG. 12. To remove the converters 200 from the faceplate 220, one depresses latch 21 of each ramped tab 20 so that the ramped tab 20 is deformed and can pass through the opening 222 to allow the converter 200 to be removed from the faceplate 220. In a preferred embodiment, the converter 200 fits into a 6000 MULTI MEDIA OUTLET commercially available from ADC of Minneapolis, Minn.

Figure 14:
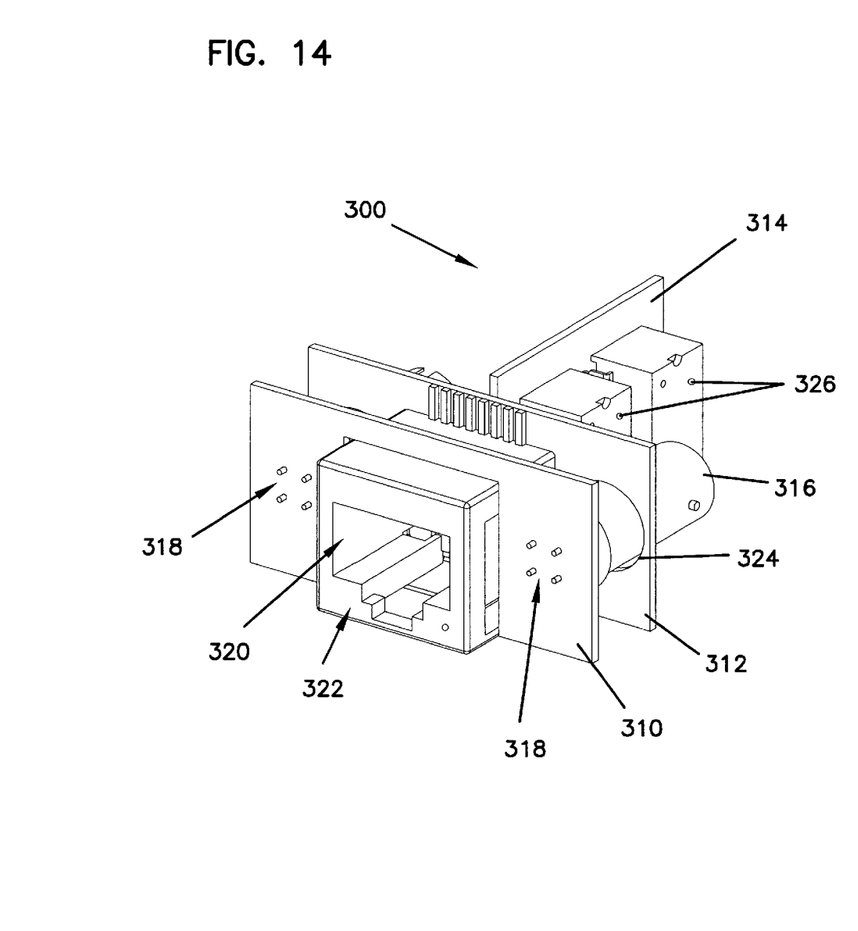
FIG. 14 is a front perspective view of a circuit assembly according to another preferred embodiment of the present invention.
Figure 15:
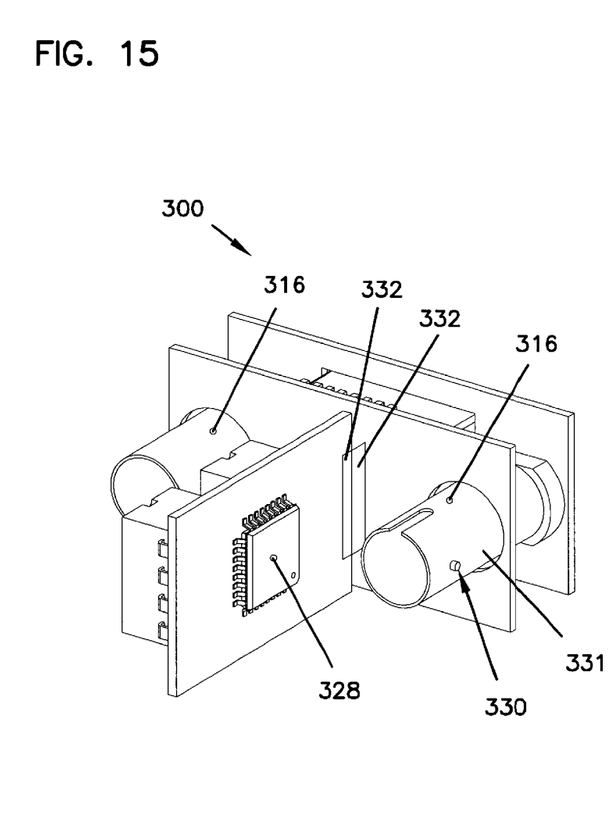
FIG. 15 is a rear perspective view of the circuit assembly shown in FIG. 14.

FIGS. 14 and 15 are front and rear perspective views respectively of a circuit assembly 300 according to another preferred embodiment of the present invention. In this embodiment, the circuit assembly 300 includes a first motherboard 310, a second motherboard 312, and a daughter board 314. The first motherboard 310 has an aperture 320 formed therein through which a jack 322 such as an RJ-45 jack fits. The jack 322 is electrically coupled to the second motherboard 312. Electrically coupled to the first motherboard 310 through couplings 318 are two optic fiber connectors 316. The ferrules 331 of the fiber optic connectors 316 extend through apertures 324 formed in the second motherboard 312. Located on one side of the daughter board 314 are filters 326 and located on the other side of the daughter board 314 is a converter chip 328 such as the type discussed with reference to FIGS. 8 and 9. The daughter board 314 is electrically coupled to the second motherboard by connectors 332 located on both the daughter board 314 and second motherboard 312.

While the present invention has been described as a media converter that converts between electrical and optical signals, the present invention is not limited to that particular converter. For example, the RJ-45 jack can be replaced with a coaxial connector. In addition, the optic connectors may be coupled to single mode or multimode fiber. In addition, optical to optical converters may be used. Thus, conversions may be made between copper and fiber and fiber and fiber.

By providing the converter in a wall mounted housing, regular patch cord extends from the wall unit to a workstation, for example. Thus, special, expensive fiber optic cable is not necessary at the workstation. In addition, because the converter is in the wall, an additional box is not needed between the wall and the terminal equipment which eliminates clutter and cost.

Figure 16:
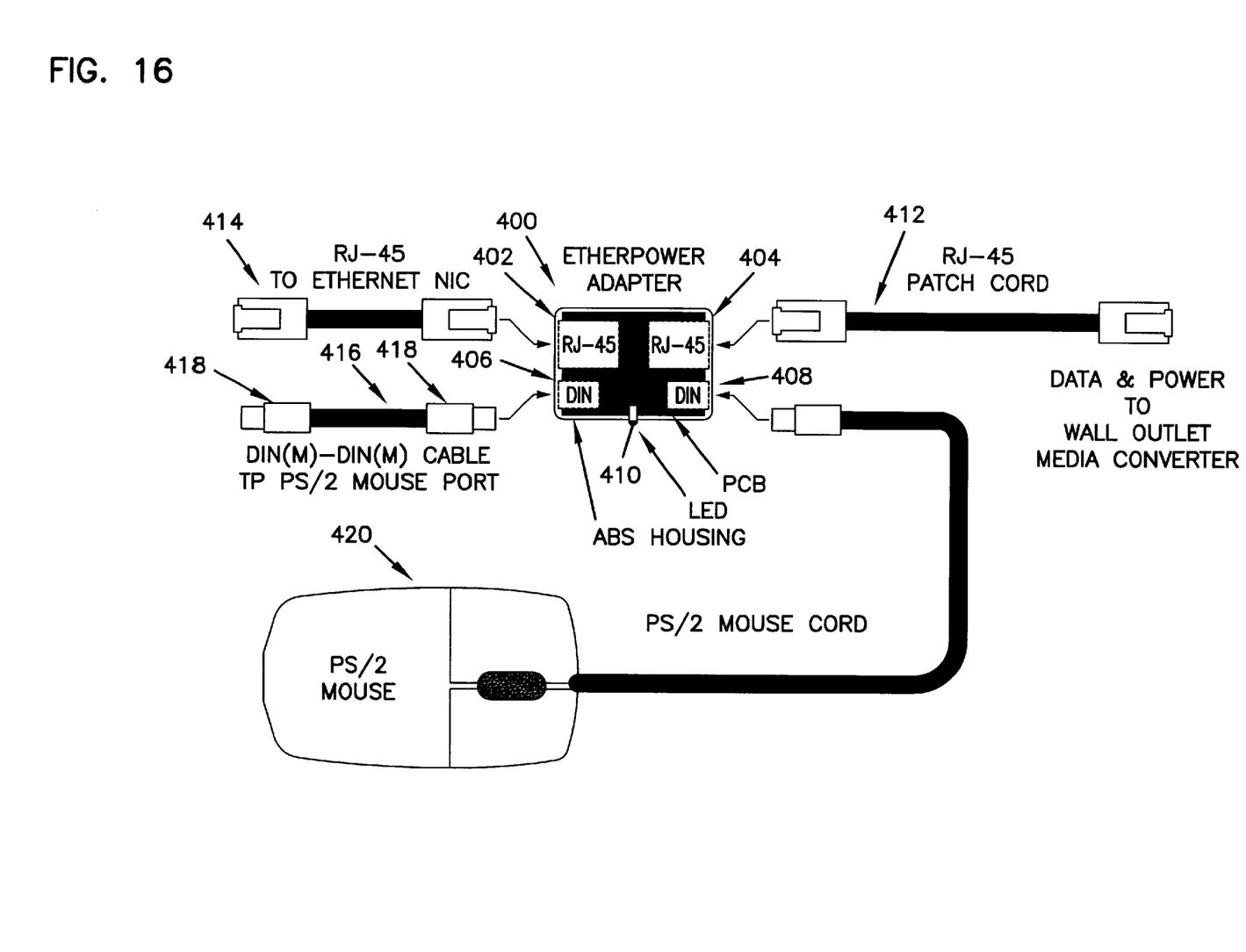
FIG. 16 is a schematic illustration of an adapter used to power the media converter of the present invention.

The converter can be powered remotely from a device coupled to the patch cord using unused wire pairs in the patch cord. More particularly, FIG. 16 is a schematic illustration of an adapter 400 used to power the media converter of the present invention. The adapter is a device that consists of a plastic housing, a printed circuit board (not shown), two miniature DIN connectors 406, 408, two RJ-45 jacks 402, 404, a resistor (not shown), and an LED 410. All of the connectors and components are assembled onto the printed circuit board. The plastic housing is designed to encase the printed circuit board assembly leaving an opening on each end for access to the miniature DIN connectors 406, 408 and RJ-45 jacks 402, 404 to facilitate cable connection.

The adapter 400 is designed to allow an external or ancillary network device such as the media converter of the present invention to receive power via the unused conductors in a RJ-45 patch cord 412. Power is obtained from a PC mouse port (not shown) coupled to the adapter 400 via RJ-45 cable 414. This is accomplished by coupling the PC mouse port 406 and the port from a network interface card 402 through the adapter 400. The mouse port 406 is connected to the adapter 400 via a 1 m, 6-conductor cable 416 using male miniature DIN connectors 418 on each end. The network interface card port (not shown) is connected to port 402 via a 1 m RJ-45 patch cord 414. Ports 402, 406 provide the PC inputs to the adapter 400. The PC mouse 420 or pointing device is connected to the adapter 400 on the output side through port 408. The external or ancillary network device such as the media converter 400 is connected to the adapter via a standard RJ-45 patch cord 412.

Figure 17:
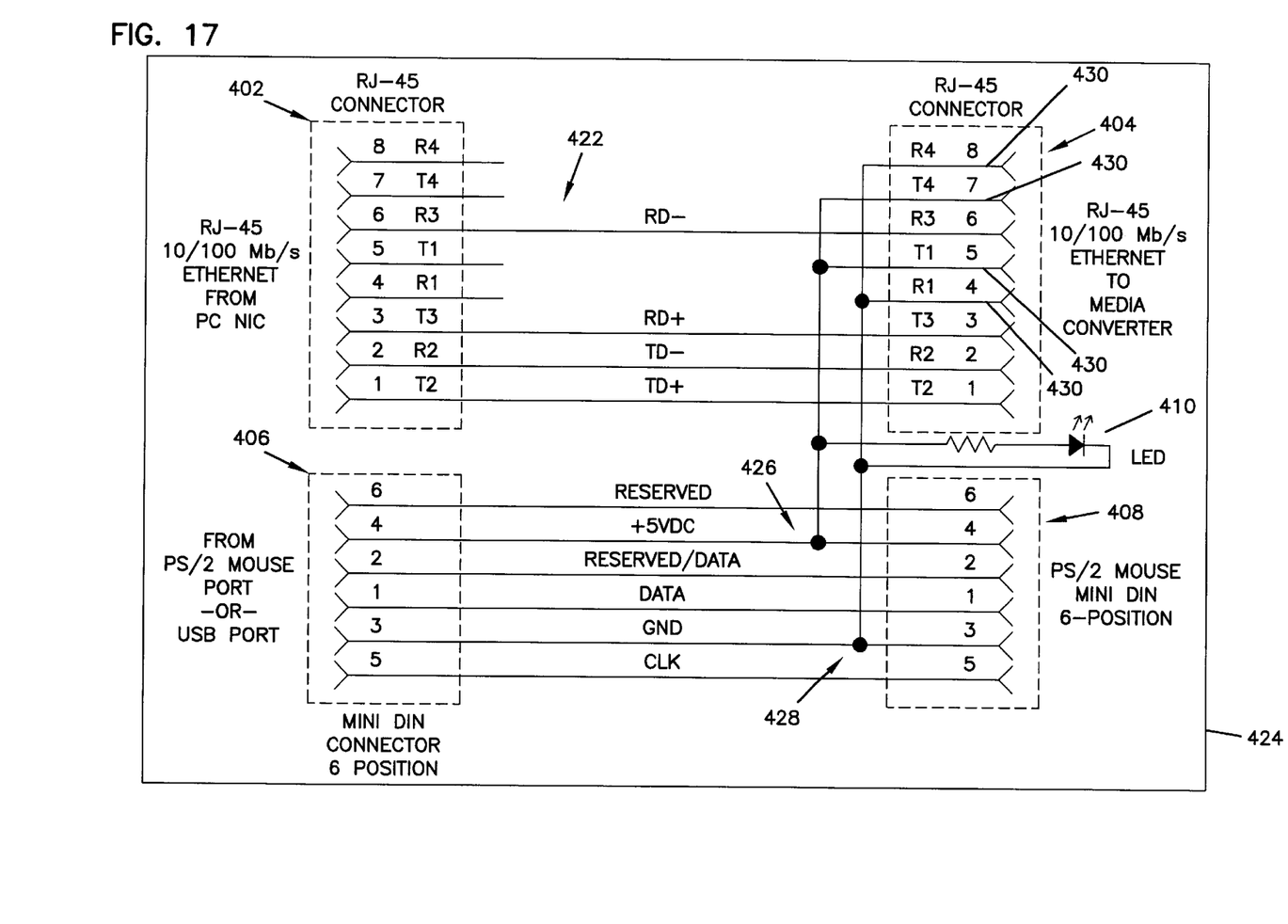
FIG. 17 is a wiring schematic of the adapter shown in FIG. 16.

FIG. 17 is a wiring schematic of the adapter shown in FIG. 16. The interconnection of the connectors through port 408 is accomplished by conductor traces 422 according to the present invention on a printed circuit board 424. The signal pins for the DIN connectors 402–408 are passed through on pin-for-pin basis. The +5VDC (pin 4) 426 and GROUND (pin 3) 428 from the mouse port 406, 408 and RJ-45 jacks 402, 404 are tapped and connected to the unused pins 430 of the output RJ-45 jack 404. Since most local area network systems require only two pairs, one for transmit and one for receive, the unused pairs are used to supply +5VDC and GROUND to an external or ancillary network device such as a media converter according to the present invention.

An LED indicator 410 is visible on one side of the adapter 400. The LED 410 is powered by the +5VDC obtained from the PC mouse port 406 and serves as a "power on" indicator.

The adapter 400 allows an external or ancillary network device to be powered from a PC without the use of an external power supply and without the need for a secondary power cord. Using the adapter 400, external or ancillary devices can be powered up to 90 meters away from the PC. This allows the external device to be located anywhere within the standard cable limits as defined by TIA/EIA 568B. Providing power by this technique is also a safety improvement. Since no external power supply is required, the external device is only active when the PC is powered up. When the PC is powered down, so is the remote device.

The elimination of the external power supply reduces the number extra AC outlets required in the vicinity of the PC. This reduces cost, workstation clutter, and congestion in cable raceways, especially in modular furniture applications.

Having described preferred aspects and embodiments of the present invention, modifications and equivalents of the disclosed concepts may readily occur to one skilled in the art. However, it is intended that such modifications and equivalents be included within the scope of the claims which are appended hereto.

What is claimed is:

1. A media converter housing comprising:
    a front housing including:
        a port for receiving a first connector;
        a plurality of notches located on a periphery of the front housing;
    a rear housing including:
        an open first end and a closed second end located distally from the first end, the rear housing having a shoulder region located adjacent to the first end and a tubular region coupling the shoulder region to the closed end;
        a plurality of ramped protrusions located on an exterior surface of the shoulder;
    wherein the plurality of ramped protrusions located on the exterior surface of the shoulder of the rear housing engage the plurality of notches on the front housing to provide a snap-fit connection; and
    wherein a cavity is defined by the front housing and rear housing when the front housing and the rear housing are mated together, the cavity sized to receive a converter circuitry.

2. The housing of claim 1 wherein the front and rear housing are made of plastic.

3. The housing of claim 1 wherein the front and rear housing are dimensioned to fit into a faceplate.

4. The housing of claim 3 wherein the faceplate is mounted on a structure and the front and rear housing are dimensioned to be insertable and removable from the faceplate without removing the faceplate from its mounted structure.

5. An upgradeable converter assembly comprising:
    a housing; and
    a circuit assembly located within the housing, the circuit assembly comprising:
        a first connector mounted on a motherboard for transmitting and receiving signals in a first format;
        a second connector mounted on the motherboard for transmitting and receiving signals in a second format wherein the second format is different than the first format; and
        a converter mounted on a daughter board electrically coupled to the first and second connectors on the motherboard wherein the converter converts signals received in the first format to the second format and vice versa and wherein the daughter board is releasably connected to the motherboard.

6. The converter assembly of claim 5 wherein the housing assembly comprises:
    a front housing having a first mounting structure; and
    a rear housing having a second mounting structure, wherein the first and second mounting structures mount the front and rear housing together.

7. The converter assembly of claim 6 wherein the first and second mounting structure include structure for providing a releasable connection with one another.

8. The converter assembly of claim 7 wherein the releasable connection comprises a snap-fit connection.

9. The converter assembly of claim 3 wherein the first format is transmitted and received over unshielded twisted pair wire and the second format is transmitted and received over fiber optic cable.

10. The converter assembly of claim 5 wherein the first connector is a coaxial connector and the second connector is a multimode fiber connector.

11. The converter assembly of claim 5 wherein the first connector is a RJ-45 connector and the second connector is a single mode fiber connector.

12. The converter assembly of claim 5 wherein the first connector is a coaxial connector and the second connector is a single mode fiber connector.

13. The converter assembly of claim 5 wherein the first connector is an RJ-45 connector and the second connector is a multimode fiber connector.

14. The converter assembly of claim 5 wherein the first connector is a single mode fiber connector and the second connector is a multimode fiber connector.

15. The converter assembly of claim 5 wherein the first connector is a coaxial connector and the second connector is an RJ-45 connector.

16. The converter assembly of claim 5 wherein the first connector is an electrical connector and the second connector is an optical connector.

17. The converter assembly of claim 16 wherein the converter receives power through a patch cord coupled to the first connector.

18. The converter assembly of claim 16 wherein the converter receives power from a device external to the converter but coupled to the converter through the first connector.

19. The converter assembly of claim 5 wherein the first connector is an optical connector and the second connector is an optical connector.

20. The converter assembly of claim 5 wherein the converter converts at a predetermined speed of 10BASE-T.

21. The converter assembly of claim 5 wherein the converter converts at a predetermined speed of 100BASE-TX.

22. The converter assembly of claim 5 wherein the motherboard and daughterboard are parallel with one another.

23. The converter assembly of claim 5 wherein the motherboard and daughter board are perpendicular to one another.

24. The converter assembly of claim 5 wherein the daughterboard can be replaced with a second daughterboard.

25. The converter assembly of claim 5 further comprising a third connector for transmitting and receiving signals in the second format wherein the first connector is located between the second and third connectors.

26. The converter assembly of claim 23 wherein the second and third connectors extend outside the housing.

27. The converter assembly of claim 5 wherein the housing is dimensional to fit into a wall mounted faceplate.

28. The converter assembly of claim 6 wherein the front housing can be removed from the rear housing to accent the daughter board of the circuit assembly mounted therein.

29. The converter assembly of claim 5 wherein the motherboard and daughter board each have surface mounted connectors for electrically coupling the motherboard and daughter board together.

30. An upgradeable converter assembly comprising:
   a housing; and
   a circuit assembly located within the housing, the circuit assembly comprising:
      a first connector mounted on a motherboard for transmitting and receiving signals in a first format;
      a second connector mounted on the motherboard for transmitting and receiving signals in a second format wherein the second format is different than the first format; and
      a means mounted on a daughter board electrically coupled to the first and second connectors on the motherboard for converting signals received in the first format to the second format and vice versa and wherein the daughter board is releasably connected to the motherboard.

* * * * *